(12) United States Patent
Pfaller et al.

(10) Patent No.: US 12,450,845 B2
(45) Date of Patent: Oct. 21, 2025

(54) METHOD AND SYSTEM FOR PRESENTING A SHARED VIRTUAL ENVIRONMENT TO USERS RESIDING IN DIFFERENT VEHICLES, AND SERVER UNIT, USER DEVICE, AND VEHICLE

(71) Applicant: CARIAD SE, Wolfsburg (DE)

(72) Inventors: Daniel Pfaller, Wettstetten (DE); Christoph Weigand, Gaimersheim (DE)

(73) Assignee: CARIAD SE, Wolfsburg (DE)

( * ) Notice: Subject to any disclaimer, the term of this patent is extended or adjusted under 35 U.S.C. 154(b) by 225 days.

(21) Appl. No.: 18/549,863

(22) PCT Filed: Mar. 11, 2021

(86) PCT No.: PCT/EP2021/056126
§ 371 (c)(1),
(2) Date: Sep. 8, 2023

(87) PCT Pub. No.: WO2022/188974
PCT Pub. Date: Sep. 15, 2022

(65) Prior Publication Data
US 2024/0161428 A1    May 16, 2024

(51) Int. Cl.
*G06T 19/00*    (2011.01)
*G01C 21/00*    (2006.01)
(Continued)

(52) U.S. Cl.
CPC ........ *G06T 19/006* (2013.01); *G01C 21/3841* (2020.08); *G01C 21/3896* (2020.08);
(Continued)

(58) Field of Classification Search
CPC ............ G06T 19/006; G06T 2219/024; G01C 21/3841; G01C 21/3896; G01C 21/3697;
(Continued)

(56) References Cited

U.S. PATENT DOCUMENTS 9,085,303 B2 *   7/2015   Wolverton .............   B60K 35/10
9,630,631 B2 *   4/2017   Alaniz ....................   G06F 3/012
(Continued)

OTHER PUBLICATIONS

International Search Report mailed Nov. 22, 2021 for corresponding International Application PCT/EP2021/056126 filed Mar. 11, 2021, 4 pages.

*Primary Examiner* — Motilewa Good-Johnson
(74) *Attorney, Agent, or Firm* — Seed Intellectual Property Law Group LLP

(57) ABSTRACT

The disclosure relates to a method for presenting a shared virtual environment to users residing in different vehicles while driving in a real-world environment. In at least one of the vehicles, an interactive user device of that vehicle receives definition data from the user residing in that vehicle, wherein the definition data describe a new virtual event for the virtual environment, and a position sensor of the vehicle generates position data of the vehicle while the user generates the definition data, wherein the position data describe a current position of the vehicle in the real-world environment. A server device receives the definition data and the corresponding position data and generates corresponding event data of a new virtual event, wherein based on the position data a trigger region is defined that defines where in the real-world environment the virtual event shall be triggered for the users in their respective vehicle.

14 Claims, 2 Drawing Sheets

(51) Int. Cl.
*G01S 19/01* (2010.01)
*G02B 27/01* (2006.01)
*G06F 3/01* (2006.01)
*H04W 4/021* (2018.01)

(52) U.S. Cl.
CPC ............ *G01S 19/01* (2013.01); *G02B 27/017* (2013.01); *G06F 3/017* (2013.01); *H04W 4/021* (2013.01); *G02B 2027/0138* (2013.01); *G06T 2219/024* (2013.01)

(58) Field of Classification Search
CPC .............. G01S 19/01; G02B 27/017; G02B 2027/0138; G02B 2027/014; G02B 2027/0141; G02B 2027/0183; G02B 2027/0187; G02B 27/0172; G06F 3/017; G06F 3/011; H04W 4/021; H04W 4/40; G06Q 50/40; G06Q 10/10; G06Q 30/0265; G06Q 50/01; B60K 2360/5915; B60K 35/85; B60K 35/10; B60K 2360/177; B60K 2360/592; B60K 35/28; G06V 20/20; G06V 40/28; H04L 67/12; H04L 67/52; H04N 7/15; H04N 21/2146; H04N 21/816; H04N 21/85406
See application file for complete search history.

(56) References Cited

U.S. PATENT DOCUMENTS

| | | | |
|---|---|---|---|
| 10,497,174 B2* | 12/2019 | Gruenler | G01C 21/3697 |
| 10,785,621 B1 | 9/2020 | Drake et al. | |
| 2009/0237328 A1* | 9/2009 | Gyorfi | G06F 3/04845 345/9 |
| 2010/0081416 A1* | 4/2010 | Cohen | H04L 67/52 455/414.1 |
| 2010/0194782 A1* | 8/2010 | Gyorfi | H04W 4/00 455/456.3 |
| 2010/0214111 A1* | 8/2010 | Schuler | H04W 4/021 340/686.1 |
| 2011/0238751 A1* | 9/2011 | Belimpasakis | H04L 67/52 715/764 |
| 2012/0194418 A1* | 8/2012 | Osterhout | G02B 27/0149 345/156 |
| 2012/0194420 A1* | 8/2012 | Osterhout | G06F 3/013 345/156 |
| 2013/0278631 A1* | 10/2013 | Border | G06F 3/04842 345/633 |
| 2014/0063055 A1* | 3/2014 | Osterhout | G02B 27/017 345/633 |
| 2015/0100179 A1* | 4/2015 | Alaniz | G06F 3/011 701/1 |
| 2017/0053444 A1* | 2/2017 | Huang | B60K 35/10 |
| 2018/0040163 A1 | 2/2018 | Donnelly et al. | |
| 2018/0300761 A1* | 10/2018 | Pittman | G06Q 30/0269 |
| 2018/0322783 A1* | 11/2018 | Toyoda | G06N 20/00 |
| 2019/0101976 A1 | 4/2019 | Reichow et al. | |
| 2019/0302761 A1* | 10/2019 | Huang | G02B 27/017 |
| 2020/0053400 A1* | 2/2020 | Chao | H04N 21/2146 |
| 2020/0084193 A1* | 3/2020 | Beaurepaire | G05D 1/0287 |
| 2021/0346805 A1* | 11/2021 | Daniali | A63F 13/332 |
| 2022/0084256 A1* | 3/2022 | Wan | G06T 7/73 |
| 2022/0103789 A1* | 3/2022 | Jung | H04N 5/265 |

* cited by examiner

METHOD AND SYSTEM FOR PRESENTING A SHARED VIRTUAL ENVIRONMENT TO USERS RESIDING IN DIFFERENT VEHICLES, AND SERVER UNIT, USER DEVICE, AND VEHICLE

BACKGROUND

Technical Field

The disclosure relates to a method for presenting a shared virtual environment to users residing in different vehicles while the respective vehicle is driving in a real-world environment. The disclosure also provides a corresponding system and the components of that system, which are a server unit, an interactive user device for presenting a virtual environment, and a vehicle comprising such an interactive user device.

Description of the Related Art

Virtual Reality (VR) and Augmented Reality (AR) are technologies that are increasingly being used in the gaming and production sectors for displaying virtual environments. In both VR and AR, the user wears a so-called head-mounted display (HMD). In the following, the more general term "interactive user device" is used for referring to a HMD or a HMD with at least one portable controller or a HMD and an additional control circuitry linked to the HMD (and with or without the controller).

Most use cases of VR and AR are limited to a static domain, i.e., a user wears the HMD while on stationary ground (e.g., in a room of a building). However, the use of HMDs in a dynamic domain, e.g., during a dynamic car ride, is also of interest. The implementation of these approaches in production vehicles would be of great advantage. In the implementation, on the one hand, fixed VR content can be visualized for a fixed driving route and, on the other hand, VR content can be generated dynamically based on the map information of a planned driving route.

This implementation does not exploit the full potential of the VR user's positioning information in the vehicle and ignores the creation and generation of events/interactions by the VR user.

Document U.S. Pat. No. 10,785,621 B1 describes a virtual gaming system for vehicles. The system displays gaming characters in a virtual environment when the vehicle drives through a predefined region in the real-world environment and a user in the vehicle may interact with the gaming characters for example by shooting one of the characters and thus changing the state of the virtual gaming environment. When the vehicle passes by another vehicle, the current state of the gaming environment may be transmitted to the other vehicle such that a user in that other vehicle may see this changed state of the gaming environment when the other vehicle passes through the region and the user in the other vehicle interacts with the virtual gaming environment. The virtual gaming system requires that vehicles meet each other in order to transfer the current state of the gaming environment. Also, the changes that are possible in the gaming environment need to be pre-programmed by the provider of the game.

Document US 2019/0101976 A1 describes a system for displaying a virtual environment to a user in a vehicle. The displayed virtual content depends on the current driving state of the vehicle in that, for example, if the vehicle approaches a curve to fast, a warning may be displayed in the virtual environment. The user is thus confined to consuming pre-defined virtual content in the virtual environment.

Document US 2018/0040163 A1 describes a system for displaying a virtual environment that depends both on the current driving route of a vehicle (as has been described above) and an anticipated stimulus event, for example a centrifugal force caused by the vehicle driving through a curve of a road. The user only experiences virtual content that needs to be prepared by the provider of the virtual environment.

BRIEF SUMMARY

It is an object of the present disclosure to provide a system for displaying a virtual environment to users in different vehicles, wherein the virtual environment shall also reflect the individual situation of the users.

Embodiments of the disclosure provide a method for presenting a shared virtual environment to users residing in different vehicles while the respective vehicle is driving in a real-world environment. The users may reside in the vehicles at the same time or at a different, overlapping and/or non-overlapping time intervals. While a respective user is in one of the vehicles and uses an interactive user device, the user may create new virtual content by defining or editing definition data describing the respective new virtual event. To this end, in at least one of the vehicles a respective interactive user device of that vehicle receives the definition data from the respective user residing in that vehicle and/or the user device generates the definition data (automatically) in dependence on a current driving situation of the vehicle. The definition data therefore describe a user-defined and/or situation-based new virtual event for the virtual environment. This virtual event is linked to a specific trigger region in the real-world environment where the vehicle is driving. To this end, a position sensor of the vehicle generates position data of the vehicle while the user generates the definition data. The position data describe a current position of the vehicle in the real-world environment.

Such a user who creates definition data is named here as a "creating user". Additionally or alternatively, the user device may automatically generate such definition data of a new virtual event depending on sensor data describing the current driving situation. The position sensor, e.g., a receiver for a position signal of a GNSS (global navigation satellite system), for example the GPS (global positioning system), indicates where the new virtual event was generated in the real-world environment. The real-world environment may comprise a road network where the vehicles are driving. A virtual event can be, for example, a message or a drawing that the creating user may leave for other users in the virtual environment. Such a user who consumes or regards a virtual event is also called "consuming user" in the following.

For updating the virtual environment, a stationary server unit receives the definition data and the corresponding position data from out of the vehicle and generates corresponding event data of the new virtual event, wherein in dependence on the position data of the vehicle the trigger region is defined that defines wherein in the real-world environment the virtual event shall be triggered or located. The stationary server thus collects all the new virtual events that are generated by a respective creating user. The virtual environment is then populated or enriched with virtual events generated by creating users. Each virtual event is associated with a trigger position or trigger region in the real-world environment where the respective virtual event becomes accessible or visible to consuming users, when they access the virtual environment while residing in the real-world trigger region. Thus, a consuming user needs to pass by or enter the corresponding trigger region with a vehicle for detecting or seeing or accessing the corresponding virtual event in the virtual environment.

In order to access a virtual event, the following logic is provided. The server unit receives respective request data from the respective user device of at least one of the vehicles. The request data indicate that the respective vehicle approaches or enters or is positioned in the respective trigger region of one of the virtual events. The server unit then sends the corresponding event data of that virtual event to the interactive user device of that vehicle and the corresponding virtual event is displayed to the user in that vehicle as a part of the virtual environment. A respective virtual event is thus triggered or started automatically. A virtual event left in the respective trigger region by a creating user is thus presented to a respective consuming user in the respective trigger region. The virtual environment therefore becomes a common virtual environment as a creating user may generate a virtual event that may also be experienced or consumed by other, consuming users. This allows a creating user to communicate with at least one consuming user in real-time (i.e., both the creating user and the at least one consuming user use their respective interactive user device at the same time or simultaneously) or a creating user may leave a virtual event for later consumption by a consuming user, when the creating user might even have already left the trigger region.

The disclosure provides the advantage that the virtual environment may be populated or enriched with virtual events that are created or added by the users themselves, such that a communication mechanism is implemented in the virtual environment. If the respective virtual event is created automatically by the user device itself (e.g., caused by a specific driving situation), this allows signaling to at least one consuming user how the creating user felt or experienced the driving situation.

The disclosure also comprises embodiments that provide features which afford additional technical advantages.

An embodiment may comprise that while the respective user device of at least one of the vehicles receives respective definition data of one of the virtual events, the user device also receives condition data, wherein the condition data describe a current environmental condition and/or a current state of the vehicle, e.g., describing the driving situation. The condition data may be user-defined, i.e., the creating user may set or describe the condition data (e.g., by providing corresponding user input on a keyboard or with a portable controller or via voice). Additionally or alternatively at least a part of the condition data may be measured by the user device using at least one sensor of the vehicle such that the condition data describes the current driving situation and/or environmental situation of the real-world environment. Correspondingly, the server unit receives these condition data and generates a corresponding trigger condition for the new virtual event. In addition to the trigger region there is then also a trigger condition. The virtual event is only displayed to a user if the user resides in a vehicle that also fulfills the trigger condition. In other words, the consuming user experiences or is presented with the virtual event only if the consuming user is in the same situation as the creating user. This prevents the presentation of a virtual event that may not suit or correspond to the current situation of the consuming user.

According to an embodiment, the at least one trigger condition comprises:
a driving speed of the vehicle has a value that lies within a predefined speed interval,
a traffic light in the real-world environment has a predefined state,
the traffic is in a predefined state (e.g., traffic jam),
a weather in the real-world environment,
a specific heading or driving direction (e.g., north east) of the vehicle, or
a driving destination as signaled by a navigation system.

The speed interval may define that the vehicle is standing still or driving at a slow speed, i.e., a speed smaller than a pre-defined threshold value (for example, the threshold value may be greater than 0 and in an interval ranging from 5 kilometers per hour to 50 kilometers per hour). The speed interval may also define a fast speed wherein the lower limit of the speed interval may be in the range of 150 kilometers per hour to 180 kilometers per hour and the upper limit of the speed interval may be in the region of 185 kilometers per hour to 300 kilometers per hour. For example, a creating user who is in a vehicle that is driving fast may leave in a virtual event a message saying, for example, "I have been here!" and this message will only be visible to or experienced by a consuming user if the consuming user is in a vehicle that drives at a speed that is in the described high-speed interval. For a traffic light, a virtual event may be generated for the state of the traffic light in which the traffic light is red or green. For example, a user may leave a massage, for example, "This traffic light is always red when I arrive" and this virtual event is only visible to a consuming user if the vehicle of that user arrives at the traffic light while the traffic light is red. The driving speed and/or the state of the traffic light may be signaled by an electronic control unit of the respective vehicle that monitors the driving speed or the real-world environment. The state of the traffic may be described by traffic data that may be received from a traffic monitoring system to which the vehicle is connected. The state of the traffic can be for example a traffic jam such that a creating user may leave a message, for example, "There is always a traffic jam in the morning" and a consuming user will only be presented with this virtual event if the consuming user also experiences a traffic jam in the trigger region. The weather may derive from weather data that may be received from a weather station. A user may leave a message, for example, "This place looks beautiful when the sun shines" and the user may define that this virtual event may be displayed whenever a consuming user is in the trigger region while no sunshine is present (e.g., at night and/or on a cloudy day). This may inform a consuming user that the real-world environment in the trigger region looks beautiful if the sun is shining.

As a data volume of the event data can be very large, a user device is generally not able to store all available event data. According to an embodiment, the server unit generates map data from the event data of the stored virtual events and provides the map data to the vehicles, wherein the map data describe the respective trigger region of the virtual events. The data volume or data amount of the map data (e.g., measured in Megabytes) is less or smaller than the data volume of the event data as the details or the content of the virtual events does not need to be contained in the map data. In the respective vehicle the respective user device monitors the current vehicle position of the vehicle and generates the request data if the current vehicle position indicates that the vehicle approaches or enters or is positioned in the trigger region according to the map data. Thus, in each vehicle the corresponding interactive user device may administer or observe by itself where the limits or borders of the respective trigger region are. Such a trigger region may be, for example, a single spot or an area defined by a polygon or a geometrical shape or a certain section of a driving route. This enables the user device to monitor by itself whether event data for a specific virtual event shall be requested from the server. This reduces the amount of data that need to be transferred from the server to the respective vehicle and only the map data are necessary for deciding whether a virtual event needs to be rendered in the respective user device.

According to an embodiment, the definition data describe at least one of the following virtual events:
a message that is displayed in the virtual environment,
a camera image of the real-world environment,
a screenshot of the virtual environment,
an image of the user who defines the definition data,
a video stream,
a drawing
an audio message,
a haptic signal, or
a link to a media file of a song.

The creating user may thus use a virtual event to present a graphical and/or auditory and/or haptic message or experience to at least one consuming user while the consuming user passes through the trigger region.

According to an embodiment, the definition data describe an interactive virtual event where at least two users interact in real-time via their respective user device, i.e., the access the virtual environment at the same time. A creating user and a consuming user may therefore have a real-time conversation. The virtual event for such a conversation can be, for example, a video meeting and/or an interaction or other task of the users. The creating user may create the virtual event, but once the virtual event is accessed or activated by the consuming user, both users may participate or provide signals, for, e.g., a video stream and/or text messages and/or audio messages that may be interchanged between the user devices for enabling the conversation.

According to an embodiment, the definition data also comprise a geometric position that is set by the user, wherein the geometric position describes a geometric offset of the virtual event with regard to the position of the vehicle or an absolute position of the virtual event in the real-world environment. The creating user may therefore shift the position of the virtual event, for example, a message board displaying a message. The respective user device that is displaying the virtual event projects the virtual event to the geometric position. The creating user may input the geometric position by defining coordinates and/or by moving the new event in the virtual environment manually using, for example, a portable controller of the user device. If a relative position is defined using the geometric offset, the virtual event will follow the vehicle while the vehicle is moving in the real-world environment. If an absolute position is defined, the virtual event may be connected to and/or attached to an object in the real-world environment (in the case of augmented reality) or an object in the virtual event (in the case of virtual reality). This allows associating a virtual event with an object that may be visible to the consuming user while experiencing or accessing the virtual event. For example, a creating user may generate a virtual event comprising a comment regarding the respective object (e.g., "What a nice building!").

According to an embodiment, the users are registered in at least one user group and at least one virtual event is associated with a respective user group and the server unit provides the event data of that virtual event only to the respective user device of such a user who is also registered in the user group that the virtual event is associated with. This allows delimiting or restricting the access to the respective virtual environment to a limited group of spectators or users. For example, a creating user may invite a group of friends (each of which is a consuming user) to experience or access the new event. Unknown consuming users who the creating user wants to exclude from the new virtual event will not be presented with the virtual event created by the creating user.

According to an embodiment, while a virtual event is displayed to one of the users in the respective vehicle, an interaction of the user with the virtual event is monitored and the interaction is describes by interaction data that are provided to the server unit and the server unit adapts the event data of the virtual event wherein the adapted event data describe the result of the interaction. For example, a consuming user may become a creating user by leaving an answer or a comment to the consumed virtual event of another creating user. This allows the users to interact in a non-real time manner. For example, a consuming user may leave (as an interaction) a symbol indication that the consuming user likes the virtual event. This may be signaled to the creating user who created or generated the virtual event.

According to an embodiment, the respective user device the respective virtual event is displayed in a common virtual environment background that is super-imposed over the real-world environment. Such a virtual environment background can be a virtual stage where the users may leave or position their virtual events as object or content. By providing a virtual environment background, the user device generates a virtual reality where the real-world environment is not visible to the user. As it is known from the prior art, the virtual environment background may represent objects from the real-world environment, for example a road that the vehicle is currently driving on.

According to an embodiment, the respective user device the respective virtual event is projected into the respective user's view on the real-world environment. This is an augmented reality where a user is presented at least one virtual event, for example an object, while regarding or viewing the real-world environment.

As a solution for achieving the above-stated object the disclosure provides a system comprising a server unit for receiving and storing and sending out event data and at least one interactive user device for a respective vehicle, wherein the interactive user device is designed to display virtual events to a user in the vehicle and to receive definition data of new virtual events from the user, wherein processing units of the server unit and the at least one interactive user device are designed to interact according to one of the embodiment of the described method. In other words, the system provides the hardware or components for performing the inventive method.

As part of a solution for achieving the above-stated object the disclosure provides a server unit for said system. The server unit may be operated as has already been described in connection with the inventive method. In other words, the server unit comprises a processing unit (i.e., processor) that is designed store event data describing the at least one virtual event of a virtual environment, wherein the virtual event is associated with the respective real-world trigger region in a real-world environment. If from an interactive user device of a vehicle respective request data are received that indicate that the vehicle approaches or enters or is position in the respective trigger region of one of the virtual events, the event data of the corresponding virtual event are sent to the user device of the vehicle for displaying the virtual event to the user in that vehicle as a part of the virtual environment. For generating the event data of the respective virtual event the processing unit is designed to receive both event data from the interactive user device of at least one of the vehicles, wherein the event data describe a user-defined new virtual event, and position data of that vehicle that describe a position of the vehicle in the real-world environment while the user generated the definition data. The server unit combines the event data and the position data to create the event data of the respective virtual event together with a trigger region where the virtual event resides in the real-world environment. The server unit may be comprised of a computer or a network of computers, for example, cloud computers. The server unit may be connected to the internet and a communication link between the server unit and the respective vehicle may be based on an internet connection and/or a wireless connection. For generating the communication link between the vehicle and a stationary network, a WiFi-technology and/or mobile phone technology (e.g., 5G) may be used.

As part of a solution for achieving the above-stated object the disclosure provides an interactive user device for a vehicle, wherein the user device comprises a processing unit that is designed
- to receive definition data from a user residing in that vehicle, wherein the definition data describe a user-defined or automatically generated new virtual event for a virtual environment, and
- to receive position data of the vehicle from a position sensor of the vehicle while the definition data where generated, wherein the position data describe a current position of the vehicle in the real-world environment, and
- to provide the definition data and the position data to an embodiment of the described server unit, and
- to send request data to the server unit for receiving event data, and
- to display to the user the received event data as a part of the virtual environment.

The user device may be designed as or comprise a HMD for displaying a VR and/or an AR environment as has been described above. For receiving user input, the user device may comprise at least one portable menu controller and/or a keyboard and/or a virtual keyboard and/or a gesture recognition system that may, e.g., based on camera data of a camera, detect a hand of the user and may recognize the gesture performed by the user, e.g., based on an artificial neural network and/or a hidden Markov model. The user device may monitor the current vehicle position based on position data generated by a receiver of a position signal of a GNSS. The user device may compare the current position with map data describing the trigger regions of virtual events. If a trigger region is approached or entered or if the vehicle is already positioned in a trigger region, the request data for requesting the event data may be sent to the server unit. For performing the method steps, the user device comprises the processing unit that may comprise at least one microprocessor and/or at least one ASIC (application specific integrated circuit). For performing the method steps, a software or program code may be stored in a data storage (i.e., memory) of the processing unit.

As part of a solution for achieving the above-stated object the disclosure provides a vehicle comprising at least one user device that is an embodiment of said the above-described interactive user device. The inventive vehicle is preferably designed as a motor vehicle, in particular as a passenger vehicle or a truck, or as a passenger bus.

The disclosure also comprises the combinations of the features of the different embodiments.

BRIEF DESCRIPTION OF THE SEVERAL VIEWS OF THE DRAWINGS

In the following an exemplary implementation of the disclosure is described.

DETAILED DESCRIPTION

The embodiment explained in the following is an advantageous embodiment of the disclosure. However, in the embodiment, the described components of the embodiment each represent individual features of the disclosure which are to be considered independently of each other and which each develop the disclosure also independently of each other and thereby are also to be regarded as a component of the disclosure in individual manner or in another than the shown combination. Furthermore, the described embodiment can also be supplemented by further features of the disclosure already described.

In the figures identical reference signs indicate elements that provide the same function.

Figure 1:
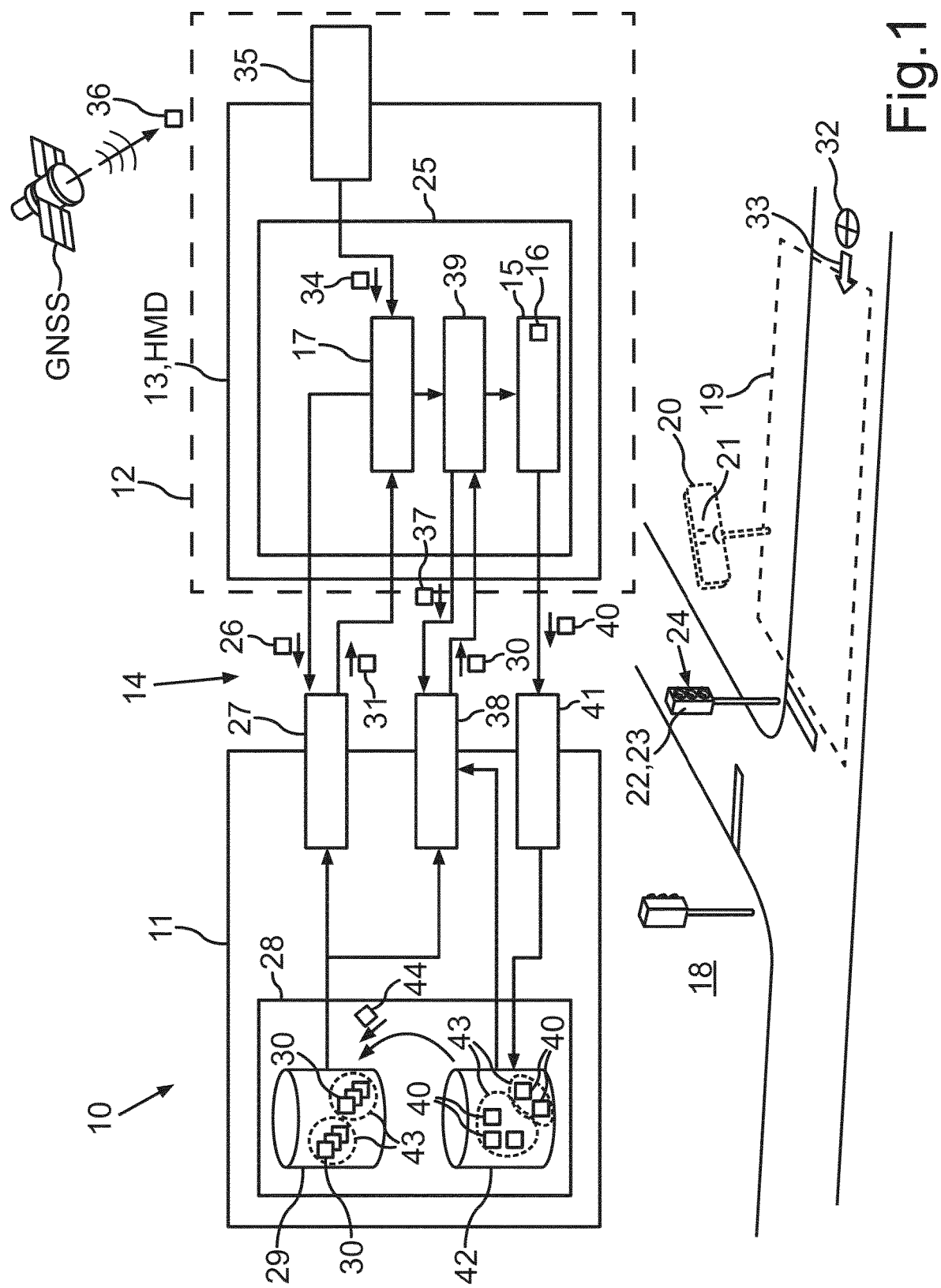
FIG. 1 shows a schematic illustration of an embodiment of the inventive system.

FIG. 1 shows a system 10 that may comprise a back-end server unit or (in short) server unit 11 and several vehicles 12. In each vehicle 12 at least one interactive user device 13 may be provided that may be designed as a head-mounted device HMD or that at least may comprise an HMD. Communication links 14 between the respective user device 13 and the server unit 11 may be operated on the basis of, e.g., an internet connection, that may be IP-based (IP—internet protocol) and/or based on a wireless connection, e.g., Wi-Fi and/or mobile communication.

The respective user device 13 may present a virtual environment, especially a VRA or VR, to a user (not shown in FIG. 1), on the basis of, e.g., a VR engine 15 that may render virtual content of a virtual environment 16 that the user may regard using the HMD. The user may also interact with the virtual environment 16. For dynamically generating the virtual environment 16 with content from other, creating users, the respective user device 13 may operate an event map 17 that may indicate where in a real-world environment 18 that respective vehicle 12 is driving in, a respective trigger region 19 may be located or positioned that may be associated with a respective virtual event 20, for example a message 21 that a user of the user device 13 may see if the vehicle 12 where the user is reciting, is in the trigger region 19 as a possible additional trigger condition 22 for example a traffic light 23 may show a red light 24. The user may then be presented the virtual event 20 in the virtual environment 16, i.e., in this example the message 21 related to for example the red traffic light 23.

For monitoring different trigger regions 19, a processing unit 25 of the user device 13 may send map request data 26 to the server unit 11. The server unit 11 may operate an event provider 27, i.e., a software module or an interface that may provide an API (application program interface) for receiving a processing a map request data 26. The server unit 11 may comprise a data storage 28 where for example in an event data base 29 event data 30 for different virtual events 20 may be stored. From the event data 30, the server unit 11, e.g., by way of the event provider, map data 31 may be generated or provided for populating or generating the event map. The user device 13 may monitor a current vehicle position 32 and optionally a current heading 33 of the vehicle 12. For example, position data 34 may be received from a receiver 35 for a position signal 36 of a GNSS. Based on the position data 34, the user device 13 may locate the vehicle 12 or the current position 32 of the vehicle 12 in regard to the event map 17. If the approach and/or the entrance or the location inside the trigger region 19 as indicated by event map 17 is detected based on the position data 34, request data 37 may be sent to the server unit 11 for requesting the corresponding event data 30, that may be sent by for example an event producer 38 of the server unit 11. The event producer 38 can be, for example, a software program code or interface, for example an API. An event re-constructor module 39 or in general a software module of the processing unit 25 may generate the corresponding event 20 based on the received event data 30, i.e., the graphical and/or audio and/or apical content that shall be dynamically integrated in the virtual environment 16. Once the virtual event 20 is integrated in the virtual environment 16, it becomes accessible or it can be experienced by the user of the user device 13. The user may interact with the virtual event 20 by way of the user device 13. This interaction may result in interaction data 40 that may be sent to the server unit 11. For example, the server unit 11 may operate a corresponding interface or API as a status event producer 41. The interaction data 40 may be stored in a user database 42 of the data storage 28 individually for each user wherein the different users and their user interaction data 40 may be grouped for example in user groups 43. From the interaction data 40, adapted user events 44 may be generated that may be valid for only the members of the user groups 43. Likewise, the event data 30 for different virtual events 20 may also be grouped in user groups 43 such that only a user who is member or registered to the user group 43 may experience or access the corresponding virtual event 20.

The user's experience of a vehicle drive is thus enhanced with geo-based, dynamic and interactive events influenced by other users. This enables gamification approaches (e.g., high score of an arcade game at a red light) as well as other interactions with other users (e.g., sharing news, videos, etc., at geo-location).

Figure 2:
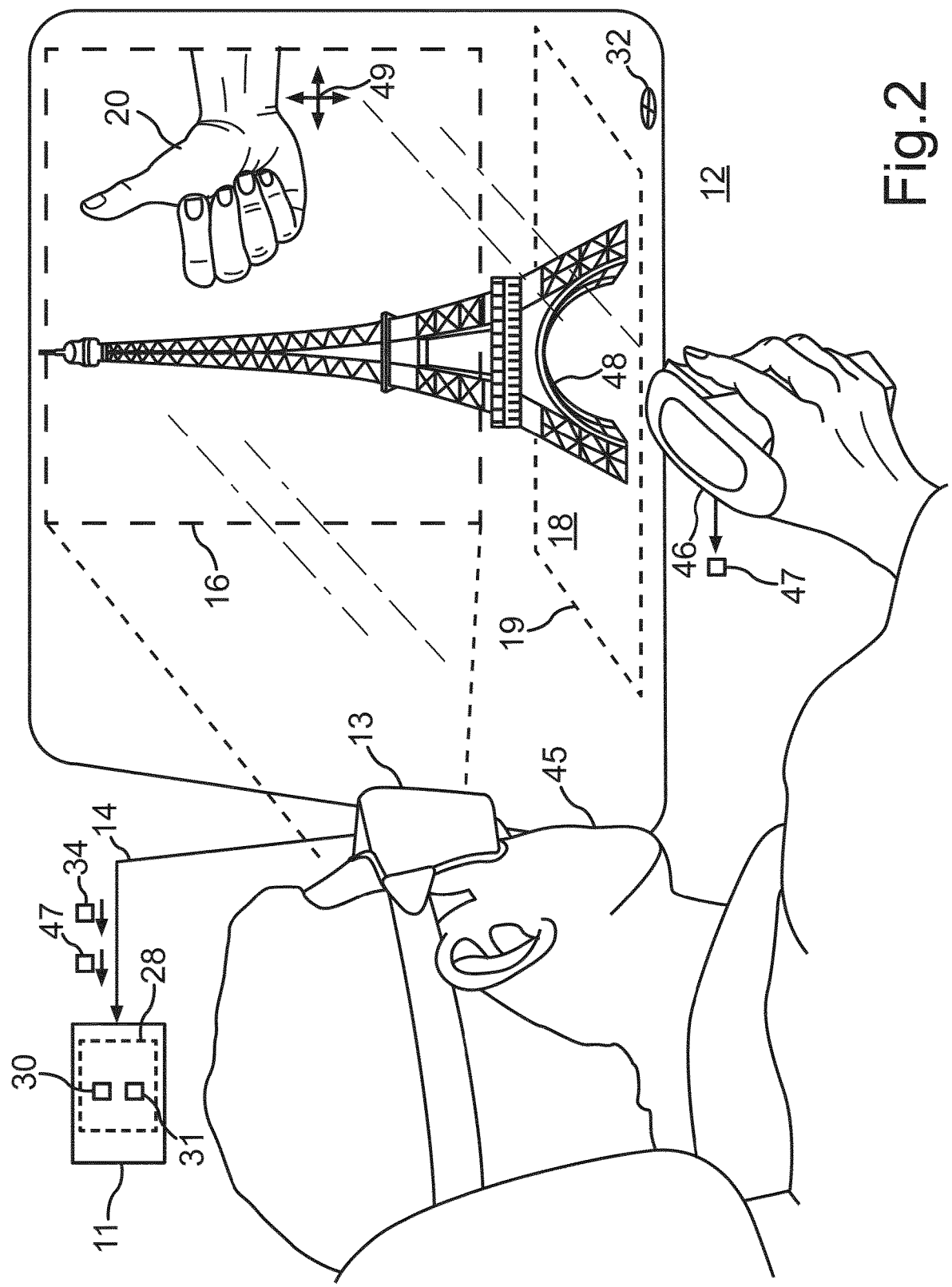
FIG. 2 shows a schematic illustration of a driving situation.

FIG. 2 illustrates how the respective event data 30 for a specific user event 20 may be generated by a respective user 45 as a creating user. The user may user the user device 13 while the user 45 is in a vehicle 12 and operates the user device 13. The user device 13 may comprise a controller 46 for providing input data or definition data 47. For example, the user 45 may access or regard the virtual environment 16 which in FIG. 2 is an augmented reality AR such that a building or in general an object 48 of the real-world environment 18 may be associated with or augmented with a virtual event 20, for example a message left by user 45 for at least one other user who is using a respective user device 13. Using, for example, the controller 46, the user 45 may set a relative or absolute geometric position 49 relative with regard to object 48 or as an absolute position in the real-world environment 18. For example, geographic coordinates and optionally a height-value may be defined. By choosing the type of the virtual event 20 and the geometric position 49, the definition data 47 are defined that may be sent to the sever unit 11 together with the current position data 34 of the current vehicle position 32. In the server unit 11, the definition data 47 and the position data 34 may be used to generate event data 30 for the virtual event 20 and the map data 31 for defining of delimiting a corresponding trigger region 19. The event data 30 and the map data 31 may then be made available to other user devices 13 as it has been explained on the basis of FIG. 1.

The system 10 may generate and display user-triggered and/or automatically generated geo-based, interactive virtual events that are to be stored in the server unit as a backend. These virtual events can then be signaled to the different VR-users/vehicles to create an event geo map. When users enter the corresponding geo area (trigger region) of one or more stored events/interactions, they can be dynamically integrated into the VR experience. The events can be interactive between the VR users.

Overall, in the virtual environment system 10, navigation and vehicle data will be exchanged between the vehicle and HMD (i.e., the interactive user device) to create the VR environment and visualize the vehicle movement in VR. In addition to these data, information for dynamic, interactive and geo-based creation of events/interactions may now be exchanged. For the exchange of information between vehicle and HMD, for example, an interface can be extended (e.g., via Bluetooth Low Energy, WiFi), but it is also possible for the HMD to communicate directly with the infrastructure of the server unit via a mobile communication standard, e.g., 5G.

In the course of the virtual environment application, information is encoded onto the "real-world" environment in the form of geometries of trigger regions on road networks in dependency involving GPS coordinates and preferably also heading of a vehicle. In addition, an event can also include metadata that includes magnitudes from environmental factors, temporal factors, and/or random parameters. The process of creating an event can be triggered on the system side by (partially) automated or manual means as well as by user input or interaction. A triggered event implies a download of user event data that can be executed, displayed or otherwise utilized on the user's side, i.e., in the vehicle where the user is residing with the user device. User event data can include both user-specific (e.g., user group information or personal data) and cross-user data.

The aim of the system is to trigger virtual event as when the geo-position of the user (i.e., the user device used by the user) and the area of the trigger region marked in the event data is within or on the stored geometry of the virtual event, preferably also depending on the heading and/or other predefined factors.

This first requires a cyclic check of the geo-position of the user domain (i.e., the user device in the respective vehicle). Depending on this, available virtual events in the vicinity and specific conditions for triggering them are retrieved from an event database as map data located in the backend, e.g., via an event provider, and stored in an event map in the user device. The VR environment generated by the user device is continuously checked for all stored events to see if they are to be triggered. As soon as the user device detects the triggering of an event for the currently displayed VR environment, request data signaling a request for the corresponding event data is sent to, e.g., an event producer located in the backend server unit, which subsequently initiates the download of the user event data, which is processed, e.g., in an event reconstructor within the user device, for the VR environment on the part of the user domain, i.e., the user device. When executing, displaying or otherwise utilizing the event data, it is also possible to store certain status information of the user as interaction data within the backend server unit and to take this into account when triggering the same virtual event again or when triggering other, related virtual events.

Overall, the example shows how real-world location-based events may be provided in a dynamic virtual environment.

Patent Cooperation Treaty patent application no. PCT/EP2021/056126, filed Mar. 11, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for presenting a shared virtual environment to users residing in different vehicles while the respective vehicle driving in a real-world environment, the method comprising:
   receiving, by a respective interactive first user device of a first vehicle, definition data from a user in the first vehicle, or generating the definition data based on a current driving situation of the vehicle, wherein the definition data describe a new virtual event for the virtual environment;
   generating, by a position sensor of the first vehicle, position data of the first vehicle while the user generates the definition data, wherein the position data describe a current position of the first vehicle in the real-world environment;
   receiving, by a server device, the definition data and the position data from the first vehicle;
   generating, by the server device, event data of the new virtual event, wherein based on the position data a trigger region is defined that defines where in the real-world environment the new virtual event shall be triggered;
   receiving, by the server device, request data from a second user device a second vehicle, wherein the request data indicate that the second vehicle approaches or enters or is positioned in the trigger region;
   sending, by the server device, the event data of the new virtual event to the first user device of the first vehicle; and
   displaying, in the first vehicle, the corresponding virtual event as a part of the virtual environment.

2. The method according to claim 1, further comprising:
   while the first user device of the vehicles receives the definition data of the new virtual event, receiving, by the first user device, condition data, wherein the condition data describe a current environmental condition or a current state of the vehicle;
   receiving, by the server device, the condition data;
   generating, by the server device, at least one trigger condition for the new virtual event, wherein the new virtual event is displayed to the user in the first vehicle if the first vehicle fulfills the at least one trigger condition.

3. The method according to claim 2, wherein the at least one trigger condition comprises:
   a driving speed of the first vehicle has a value that lies within a predefined interval,
   a traffic light in the real-world environment has a predefined state,
   traffic is in a predefined state,
   a weather in the real-world environment
   a specific heading of the first vehicle, or
   a driving destination as signaled by a navigation system.

4. The method according to claim 1, further comprising:
   generating, by the server device, map data from the event data of stored virtual events;
   providing, by the server device, the map data to the first vehicle and the second vehicle, wherein the map data describe respective trigger regions of the stored virtual events;
   monitoring, by the second user device, a current position of the second vehicle; and
   generating, by the second user device, the request data if the current position of the second vehicle indicates that the second vehicle approaches or enters or is positioned in the trigger region according to the map data.

5. The method according to claim 1, wherein the definition data describe at least one of the following virtual events:
   a message that is displayed in the virtual environment,
   a camera image of the real-world environment,
   a screenshot of the virtual environment,
   an image of the user who defines the definition data,
   a video stream,
   a drawing,
   an audio message,
   a haptic signal, or
   a link to a media file of a song.

6. The method according to claim 1, wherein the definition data describe an interactive virtual event where at least two users interact in real-time via the first user device and the second user device.

7. The method according to claim 1, wherein the definition data also comprise a geometric position that is set by the user, wherein the geometric position describes a geometric offset of the new virtual event with regard to the current position of the first vehicle or an absolute position of the new virtual event in the real-world environment and
   wherein the first user device that is displaying the virtual event projects the new virtual event to a corresponding geometric position in the virtual environment.

8. The method according to claim 1, wherein the user in the first vehicle is registered in at least one user group and at least one virtual event is associated with the at least one user group and the server device provides event data of the at least one virtual event only to the second user device if a user in the second vehicle is also registered in a same user group with which the at least one virtual event is associated.

9. The method according to claim 1, wherein, while the new virtual event is displayed to the user in the first vehicle, an interaction of the user with the new virtual event is monitored and the interaction is described by interaction data that are provided to the server device, and the server device adapts the event data of the new virtual event, wherein the adapted event data describe a result of the interaction.

10. The method according to claim 1, wherein by the first user device the new virtual event:
    is displayed in a common virtual environment background that is super-imposed over the real-world environment as a virtual reality, VR, or
    is projected into the user's view on the real-world environment as augmented reality, AR.

11. A system comprising:
    a server device which, in operation, receives, stores, and sends out event data; and
    a first user device of a first vehicle, wherein the first user device, in operation, displays virtual events to a user in the first vehicle and receives definition data of new virtual events from the user, wherein:

the first user device of the first vehicle, in operation, receives definition data from a user residing in the first vehicle, or generates the definition data based on a current driving situation of the vehicle, the definition data describe a new virtual event for a virtual environment, a position sensor of the first vehicle generates position data of the first vehicle while the user generates the definition data, the position data describe a current position of the first vehicle in a real-world environment, the server device, in operation, receives the definition data and the position data from the first vehicle, the server device, in operation, generates event data of the new virtual event, the server device, in operation, defines, based on the position data, a trigger region that defines where in the real-world environment the new virtual event shall be triggered, the server device, in operation, receives request data from a second user device of a second vehicle, the request data indicate that the second vehicle approaches or enters or is positioned in the trigger region, the server device, in operation, sends the event data of the new virtual event to the first user device of the first vehicle, and the first user device, in operation, displays the corresponding virtual event as a part of the virtual environment.

12. The system according to claim 11, wherein the server device comprises a processor that, in operation, stores event data describing at least one virtual event of a virtual environment, wherein the virtual event is associated with a respective real-world trigger region in a real-world environment, and if, from the first user device of the first vehicle, respective request data are received that indicate that the first vehicle approaches or enters or is positioned in the trigger region of one of the virtual events, the event data of the corresponding virtual event are sent to the first user device of the first vehicle for displaying the virtual event to the user in the first vehicle as a part of the virtual environment, wherein the processor, in operation:

receives event data from the first user device of the first vehicle, wherein the event data describe a new virtual event, and receives position data of the first vehicle that describe a position of the first vehicle in the real-world environment while the definition data where generated in the first vehicle, combines the event data and the position data to create the event data of the virtual event together with a definition of the trigger region where the virtual event resides in the real-world environment.

13. A user device for a vehicle, wherein the user device comprises a processor that, in operation:

receives definition data from a user residing in a vehicle, wherein the definition data describe a user-defined new virtual event for a virtual environment, receives position data of the vehicle from a position sensor of the vehicle while the user generates the definition data, wherein the position data describe a current position of the vehicle in a real-world environment, provides the definition data and the position data to a server device that, in operation, stores event data describing at least one virtual event of a virtual environment, receives event data from the user device of the vehicle, wherein the event data describe a new virtual event, receives position data of the vehicle that describe a position of the vehicle in the real-world environment while the definition data where generated in the vehicle, and combines the event data and the position data to create the event data of the virtual event together with a definition of a trigger region where the virtual event resides in the real-world environment, wherein the virtual event is associated with a respective real-world trigger region in a real-world environment, and, if, from the user device of the vehicle, respective request data are received that indicate that the vehicle approaches or enters or is positioned in the trigger region of one of the virtual events, the event data of the corresponding virtual event are sent to the user device of the vehicle for displaying the virtual event to the user in the vehicle as a part of the virtual environment, sends request data to the server device for receiving event data, and displays to the user the received event data as a part of the virtual environment.

14. A vehicle comprising at least one interactive user device according to claim 13.

* * * * *

UNITED STATES PATENT AND TRADEMARK OFFICE
CERTIFICATE OF CORRECTION

PATENT NO. : 12,450,845 B2  
APPLICATION NO. : 18/549863  
DATED : October 21, 2025  
INVENTOR(S) : Daniel Pfaller et al.

Page 1 of 1

It is certified that error appears in the above-identified patent and that said Letters Patent is hereby corrected as shown below:

In the Claims

Column 11, Claim 1, Lines 19-20:
"while the respective vehicle" should be deleted.

Column 11, Claim 1, Line 22:
"respective interactive" should be deleted.

Column 11, Claim 1, Line 41:
"user device a second vehicle," should read: --user device of a second vehicle,--.

Column 12, Claim 8, Line 45:
"virtual event only to the second user" should read: --virtual event to the second user--.

Signed and Sealed this  
Third Day of February, 2026

John A. Squires  
*Director of the United States Patent and Trademark Office*